United States Patent
Mild et al.

(10) Patent No.: US 10,938,930 B2
(45) Date of Patent: *Mar. 2, 2021

(54) DYNAMICALLY ACCESSING AND CONFIGURING SECURED SYSTEMS

(71) Applicant: International Business Machines Corporation, Armonk, NY (US)

(72) Inventors: Wilhelm Mild, Boeblingen (DE); Omar-Qais Noorshams, Boeblingen (DE); Pradeep Parameshwaran, Boeblingen (DE); Guenter Vater, Boeblingen (DE); Robert Vaupel, Rottenburg (DE); Mariia Zrianina, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/532,775

(22) Filed: Aug. 6, 2019

(65) Prior Publication Data

US 2019/0364124 A1    Nov. 28, 2019

Related U.S. Application Data

(63) Continuation of application No. 15/490,166, filed on Apr. 18, 2017, now Pat. No. 10,419,564.

(51) Int. Cl.
*H04L 29/08* (2006.01)
*H04L 29/06* (2006.01)

(52) U.S. Cl.
CPC .......... *H04L 67/26* (2013.01); *H04L 63/0272* (2013.01); *H04L 63/083* (2013.01); *H04L 63/0428* (2013.01); *H04L 63/166* (2013.01)

(58) Field of Classification Search
CPC ... H04L 67/26; H04L 63/0272; H04L 63/083; H04L 63/0428; H04L 63/166
See application file for complete search history.

(56) References Cited

U.S. PATENT DOCUMENTS 5,970,149 A    10/1999  Johnson
8,312,323 B2 * 11/2012  Gokhale ............. G06F 11/0751
                                              714/31

(Continued)

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.

(Continued)

*Primary Examiner* — Jerry B Dennison
(74) *Attorney, Agent, or Firm* — Heslin Rothenberg Farley & Mesiti P.C.; William A. Kinnaman, Esq.

(57) ABSTRACT

A method, computer program product, and system includes a processor(s) in a first computing environment obtaining, from a computer system in the first environment, a system message indicating an issue in the computer system. The processor(s) evaluate the message to determine details of the issue and determine recommended action(s) to remedy the issue. The processor(s) generate a notification comprising the action(s), which include calls to portions of the computer system and the notification comprises respective selection options to trigger the processor(s) to execute each of the one or more recommended actions in the first environment. The processor(s) transmit the notification to a computing node in a second computing environment to communicate to a computing device in that environment. The processor(s) receive a response indicating selection of a respective selection option. The processor(s) translate the option into a recommended action and issue calls in the recommended action to the computer system.

20 Claims, 11 Drawing Sheets

(56) References Cited

U.S. PATENT DOCUMENTS

| | | | |
|---|---|---|---|
| 8,738,767 B2 | 5/2014 | Fake et al. | |
| 2003/0036886 A1* | 2/2003 | Stone | G06F 11/2023 |
| | | | 702/188 |
| 2003/0051026 A1 | 3/2003 | Carter et al. | |
| 2005/0049924 A1 | 3/2005 | DeBettencourt et al. | |
| 2005/0234988 A1* | 10/2005 | Messick | H04L 67/2819 |
| 2007/0143826 A1* | 6/2007 | Sastry | H04L 63/0492 |
| | | | 726/2 |
| 2008/0046546 A1* | 2/2008 | Parmar | G06F 11/3089 |
| | | | 709/220 |
| 2010/0257412 A1* | 10/2010 | Acuna | G06F 11/0727 |
| | | | 714/54 |
| 2012/0179939 A1 | 7/2012 | Collins, Jr. | |
| 2013/0047039 A1* | 2/2013 | Manes | G06F 11/3466 |
| | | | 714/47.1 |
| 2013/0061095 A1 | 3/2013 | Caffrey | |
| 2013/0332685 A1* | 12/2013 | Kripalani | G06F 3/0689 |
| | | | 711/162 |
| 2014/0006600 A1* | 1/2014 | Hong | G06F 9/542 |
| | | | 709/224 |
| 2015/0172321 A1* | 6/2015 | Kirti | H04L 63/1416 |
| | | | 726/1 |
| 2015/0242264 A1 | 8/2015 | Vibhor et al. | |
| 2016/0057034 A1* | 2/2016 | Rosier | H04L 43/08 |
| | | | 709/224 |
| 2017/0251013 A1* | 8/2017 | Kirti | H04L 63/1441 |
| 2017/0264527 A1* | 9/2017 | Jain | H04L 41/0654 |
| 2018/0034837 A1* | 2/2018 | Lakhani | H04L 63/1425 |
| 2018/0131574 A1* | 5/2018 | Jacobs | G06F 8/65 |
| 2018/0131579 A1* | 5/2018 | Jacobs | H04L 41/082 |
| 2018/0152320 A1* | 5/2018 | Meyer | H04L 67/141 |
| 2018/0205715 A1* | 7/2018 | Ingale | H04L 63/08 |
| 2018/0285204 A1* | 10/2018 | Dwarampudi | G06F 21/6245 |
| 2018/0302483 A1 | 10/2018 | Mild et al. | |

OTHER PUBLICATIONS zEvent; Mobile Systems Management of z/OS, http://www-03.ibm.com/systems/z/os/zos/features/zevent/zevent.html, 2-pages, dated Dec. 21, 2016.

List of IBM Patents or Patent Applications Treated as Related, Aug. 20, 2019, 2 pages.

* cited by examiner

```
                                                                    300
┌─────────────────────────────────────────────────────────────┐
│ ONE OR MORE PROGRAMS EXECUTING ON A GATEWAY/MIDDLEWARE      │
│ SERVER IN A SECURED ENVIRONMENT RECEIVE A SYSTEM MESSAGE    │
│ FROM A SECURED SYSTEM INDICATING THAT THE SECURED SYSTEM    │~310
│ HAS EXPERIENCED AN ISSUE, WHERE THE SYSTEM MESSAGE          │
│ INCLUDES SECURE DATA CHARACTERIZING THE ISSUE               │
└─────────────────────────────────────────────────────────────┘
                              │
                              ▼
         ┌──────────────────────────────────────────┐
         │ ONE OR MORE PROGRAMS EVALUATE THE SYSTEM │~320
         │ MESSAGE TO DETERMINE DETAILS OF THE ISSUE│
         └──────────────────────────────────────────┘
                              │
                              ▼
┌─────────────────────────────────────────────────────────────┐
│ ONE OR MORE PROGRAMS GENERATE AT LEAST ONE                  │
│ RECOMMENDED MANAGEMENT ACTION TO REMEDY THE SYSTEM          │~330
│ ISSUE, WHERE SELECTING EACH MANAGEMENT ACTION RESULTS IN    │
│ A REQUEST TO A CALL OF THE SECURED SYSTEM AND THE           │
│ RECOMMENDED MANAGEMENT ACTION DOES NOT INCLUDE THE          │
│ SECURE DATA BUT MAY INCLUDE CALLS TO THE SECURE DATA        │
└─────────────────────────────────────────────────────────────┘
                              │
                              ▼
┌─────────────────────────────────────────────────────────────┐
│ ONE OR MORE PROGRAMS 215 GENERATE A NOTIFICATION INCLUDING  │~340
│ THE AT LEAST ONE RECOMMENDED MANAGEMENT ACTION              │
└─────────────────────────────────────────────────────────────┘
                              │
                              ▼
┌─────────────────────────────────────────────────────────────┐
│ UTILIZING A SECURED PROTOCOL, THE ONE OR MORE PROGRAMS      │
│ TRANSMIT THE NOTIFICATION TO A SERVER OUTSIDE THE SECURED   │~350
│ ENVIRONMENT THAT PROVIDES AN APPLICATION AS A SERVICE TO A  │
│ MOBILE DEVICE OF AN AUTHORIZED USER OF THE SECURED SYSTEM   │
└─────────────────────────────────────────────────────────────┘
                              │
                              ▼
┌─────────────────────────────────────────────────────────────┐
│ BASED ON OBTAINING, VIA THE APPLICATION ON THE MOBILE       │
│ DEVICE, A SELECTION OF ONE RECOMMENDED MANAGEMENT           │~360
│ ACTION, THE ONE OR MORE PROGRAMS TRANSLATE THE              │
│ SELECTION TO THE CALL OF THE SECURED SYSTEM TO REMEDY       │
│ THE ISSUE IN ACCORDANCE WITH THE SELECTION                  │
└─────────────────────────────────────────────────────────────┘
```

FIG. 3

DYNAMICALLY ACCESSING AND CONFIGURING SECURED SYSTEMS

BACKGROUND

A mainframe requires permanent surveillance to avoid any downtime in case of problems. If an issues arises, an error message is usually written to a console log and requires the attention of the system administrator. Accessing this information remotely and addressing the issue is not possible because of the secured location in which the logs reside.

SUMMARY

Shortcomings of the prior art are overcome and additional advantages are provided through the provision of a method for remedying an issue in a secured computing environment by a remote user. The method includes, for instance: obtaining, by one or more processors in a first computing environment, from a computer system in the first environment, a system message indicating an issue in the computer system; evaluating, by the one or more processors, the contents of the system message, wherein the system message comprises data from the computer system to determine details of the issue; based on determining the details of the system issue, determining, by the one or more processors, one or more recommended actions to remedy the issue; generating, by the one or more processors, a notification comprising the one or more recommended actions, wherein the one or more recommended actions comprise calls to portions of the computer system, wherein the generating comprises retaining the data in the first environment, wherein the notification comprises respective selection options to trigger the one or more processors to execute each of the one or more recommended actions in the first environment; transmitting, by the one or more processors, the notification to a computing node in a second computing environment, wherein based on receiving the notification, the computing node communicates the notification to a computing device in the second computing environment; receiving, by the one or more processors, via a secure protocol, from the computing device, a response indicating selection of a respective selection option of the respective selection options; translating, by the one or more processors, the respective selection option into a recommended action of the one or more recommended actions; and issuing, by the one or more processors, based on the recommended action, calls comprising the recommended action to the computer system to remedy the issue.

Shortcomings of the prior art are overcome and additional advantages are provided through the provision of a computer program product for remedying an issue in a secured computing environment by a remote user. The computer program product comprises a storage medium readable by a processing circuit and storing instructions for execution by the processing circuit for performing a method. The method includes, for instance: obtaining, by one or more processors in a first computing environment, from a computer system in the first environment, a system message indicating an issue in the computer system; evaluating, by the one or more processors, the contents of the system message, wherein the system message comprises data from the computer system to determine the details of the issue; based on determining the details of the system issue, determining, by the one or more processors, one or more recommended actions to remedy the issue; generating, by the one or more processors, a notification comprising the one or more recommended actions, wherein the one or more recommended actions comprise calls to portions of the computer system, wherein the generating comprises retaining the data in the first environment, wherein the notification comprises respective selection options to trigger the one or more processors to execute each of the one or more recommended actions in the first environment; transmitting, by the one or more processors, the notification to a computing node in a second computing environment, wherein based on receiving the notification, the computing node communicates the notification to a computing device in the second computing environment; receiving, by the one or more processors, via a secure protocol, from the computing device, a response indicating selection of a respective selection option of the respective selection options; translating, by the one or more processors, the respective selection option into a recommended action of the one or more recommended actions; and issuing, by the one or more processors, based on the recommended action, calls comprising the recommended action to the computer system to remedy the issue.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 3 is a workflow illustrating certain aspects of an embodiment of the present invention;

DETAILED DESCRIPTION

Figure 1:
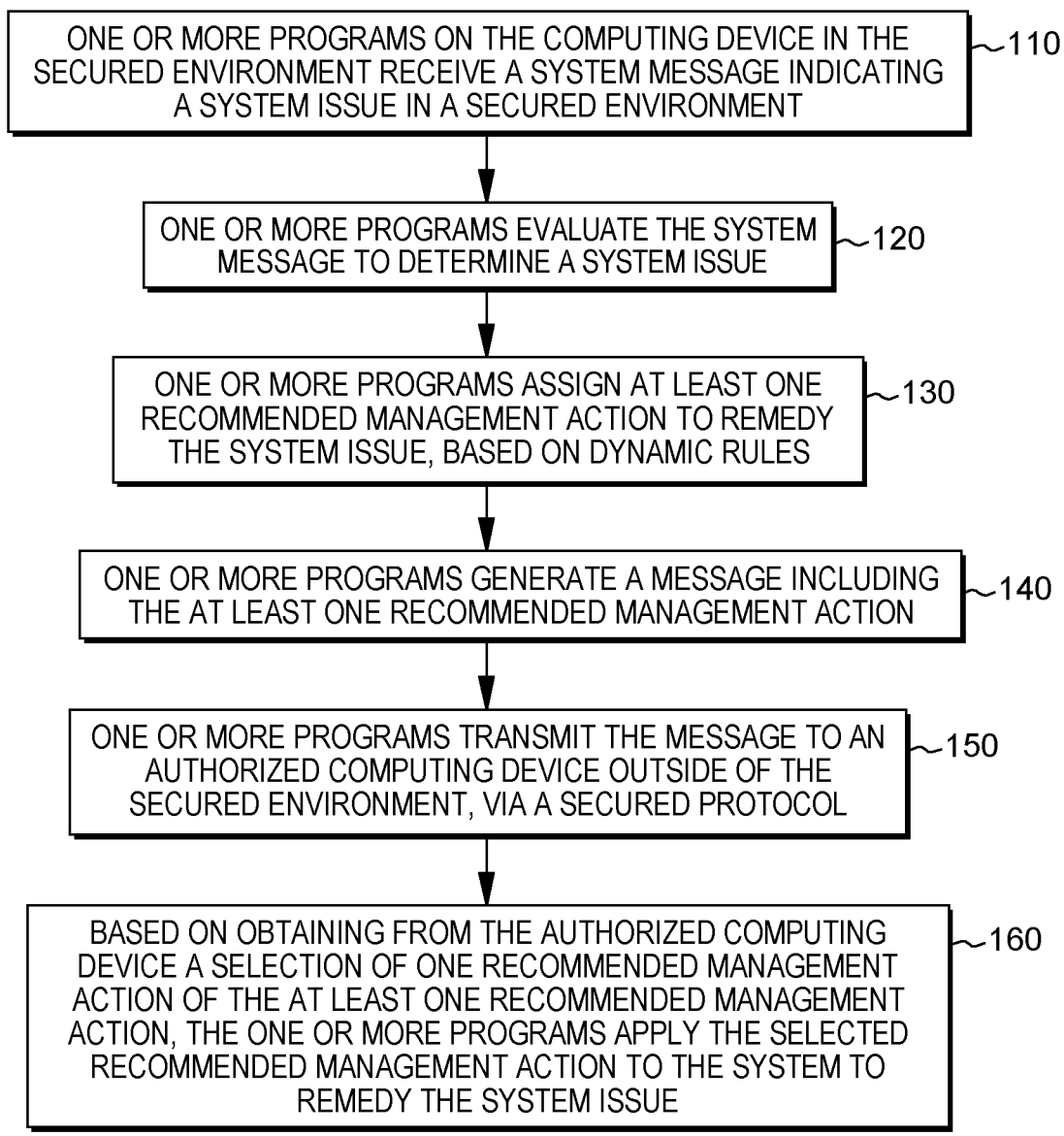
FIG. 1 is a workflow illustrating certain aspects of an embodiment of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 8:
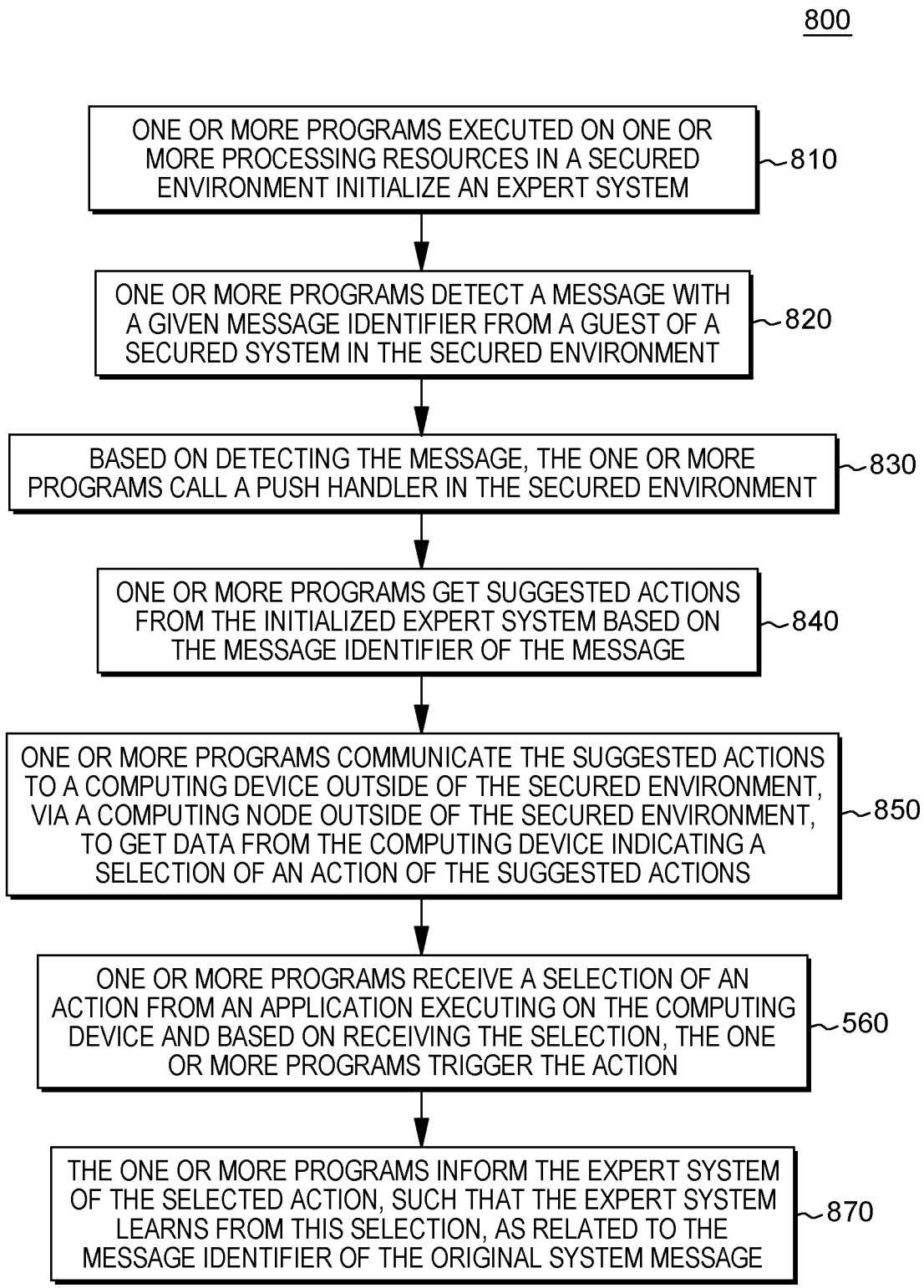
FIG. 8 is a workflow illustrating certain aspects of an embodiment of the present invention.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 8 as program/utility 40, having a set (at least one) of program modules 42, may be stored in memory 28.

In embodiments of the present invention, a computer-implemented method, a computer program product, and a computer system include program code that provides a method for dynamically accessing and configuring secured systems by utilizing connectivity provided through mobile computing. In some embodiments of the present invention, one or more programs executed by at least one processing circuit provide an alert of a system failure involving a computer system that resides within a restricted security realm (also referred to herein as a secured environment) to a remote user (e.g., an administrator). The one or more programs provide the alert to the remote user on a computing device (e.g., a mobile computing device) that is accessible to the user, but is located outside of the restricted security realm. In embodiments of the present invention, the alert provides the mobile computing device (and therefore the user of the device) with data about the issue that triggered the alert and/or a minimal set of operations to resolve the issue.

The advantages of aspects of embodiments of the present invention are inextricably tied to computing at least because the one or more programs mitigate failures in secure computing system in a novel manner by providing information to a user outside of a restricted security realm (e.g., a systems administrator) in a manner that enables the user to handle the error from outside of the realm, without compromising the security of the systems within the realm, and without compromising sensitive information exposed by the failing system. To provide a user with the option to address failures in a secured system remotely and securely, one or more programs in some embodiments of the present invention that execute within the restricted realm, monitor the secured systems for failures. Based on detecting a failure/error, the one or more programs generate an inoculated alert and a set of potential operation options (e.g., reset, reboot, move, no action, etc.) and forward the alert and the options (i.e., a notification) to a user's mobile device, via a secure protocol, which is described herein. In this manner, the one or more programs have provided the operator of the mobile device outside of a secured system with a secure means to perform a selected operation on the secured system from the set of potential options.

In some embodiments of the present invention, in order to mitigate an issue in the secured system without exposing sensitive data within the system to resources outside of the secured system, the one or more programs generate a set of recommended management actions that do not include the sensitive data. A restricted security realm in which a potentially failing system resides may include computer resources that house sensitive data that cannot be accessed by third party computing devices residing outside the secured environment. Thus, the computing resources in the restricted security realm include and may be protected by a management component, which provides an authentication mechanism for providing management actions in the secured environment. In some embodiments of the present invention, this management component also includes one or more programs that provide the set of recommended management actions, based on system problems, which are derived from the sensitive data, but exclude the sensitive data itself from the notification to the remote user.

An example of a computer system that is a restricted security realm in which aspects of embodiments of the present invention are beneficial, is a computing environment comprised of a mainframe. One example of a mainframe that can be monitored and remedied by one or more programs in some embodiments of the present invention is an IBM® zSeries® system. IBM® and zSeries® are registered trademarks of International Business Machines Corporation, Armonk, N.Y., U.S. Embodiments of the present invention are particularly useful in a mainframe environment because mainframes, including but not limited to those in the zSeries®, are constantly surveilled to avoid any downtime. Thus, in existing systems, in the event that a surveillance program detects an issue, the program writes an error message to a console log. To rectify the error, a system administrator must access the log, but if he or she is not at the physical workplace and, for example, in a meeting or working remotely, he or she will not receive this information as he or she is outside of the secured environment in which the mainframe resides. Specifically, for security purposes, mainframes are kept in a secured, firewall-protected intranet environments. While at the remote location, the administrator will likely only have a public internet connection, adding to the difficulty of mitigating an issue remotely in a secure manner. To address the issue of mitigating mainframe issues remotely, in embodiments of the present invention, one or more programs not only provide a mechanism to inform the remote administrator of the issue, the one or more programs also enable the administrator, through a communication with a (mobile) computing device accessible to the remote administrator, to access and configure the secured system (e.g., mainframe) to mitigate issues.

Embodiments of the present invention provide various advantages over existing methods of mitigating issues in a secured computing environments, in a situation when accessing the environment from within the secured environment is problematic. For example, embodiments of the present invention provide functionality beyond issue notification. In embodiments of the present invention, rather than merely notify remote users of a system issue on a computing device that is outside of a secured environment, one or more programs executing on at least on processing circuit in the secured environment provide these remote users with functionality to change the configuration of the secured environment from this remote computing device and/or take additional actions to mitigate the issue (e.g., reset, reboot, move, no action, etc.). This aspect of embodiments of the present invention eliminates the need for an administrator to access a hypervisor or virtual machine monitor (VMM), in person, for example, using remote desktop protocols (RDP) over a virtual private network (VPN), which can be cumbersome and less secure. Embodiments of the present invention enable a user to make configuration changes in a secured environment from a device that is outside of the secured environment. The one or more programs in embodiments of the present invention enable the remote user to make these changes using Hypertext Transfer Protocol (HTTP) within a connection encrypted by Transport Layer Security, or its predecessor, Secure Sockets Layer (i.e., HTTPS) with username and password authentication, eliminating workarounds that allow the remote computing device to temporarily operate within the secured environment, such as connecting using VPN.

Another advantage of some embodiments of the present invention is that one or more programs can provide notifications and resolution options to address issues in computer system in a secured environment, regardless of whether the individual is connected to an application that is monitoring the secured environment or actively utilizing a computing device. In fact, in embodiments of the present invention, one or more programs provide notifications and resolution options to a user of a computing device that is outside of the secured environment by using push notifications.

As understood by one of skill in the art, a push notification is a message that pops up on a computing device, such as a mobile computing device. The one or more programs can send push notifications at any time; users do not have to be in an application interacting with the one or more programs or actively utilizing the notified computing device, in order to receive these notifications. Thus, in embodiments of the present invention, an (administrative) user can retrieve and connect to critical system messages in the form of push notifications and make changes to the system environment from the mobile computing device itself In some embodiments of the present invention, to enable this communication, in an embodiment of the present invention, a middleware server acts as mediator gateway between a secured environment (e.g., a Series® system) and an unsecured environment. Thus, in embodiments of the present invention one or more programs in a secured environment proactively inform a user outside of the environment of an issue and enable the user, by providing sufficient information, to rectify the issue, via an architecture that includes an enabling technology that enables running further applications/software, including but not limited to, middleware.

FIG. 1 is a workflow 100 of certain aspects of some embodiments of the present invention that include one or more programs executing on at least one processing circuit that enable dynamic access and configuration of systems residing in a secured environment (e.g., the aforementioned restricted security realm) by at least one (mobile) computing device residing in an unsecured environment. In an embodiment of the present invention, one or more programs on the computing device in the secured environment receive a system message indicating a system issue (e.g., failure, error, warning, etc.) in the secured environment (110). Based on receiving this indication, the one or more programs evaluate the system message to determine a system issue (120). Based on the system issue, the one or more programs assign at least one recommended management action to remedy the system issue, based on dynamic rules (130). In an embodiment of the present invention, the dynamic rules are generated as the result of the mitigation of past system issues and therefore, provide guidance in the event that a system message matches the parameters of a system message that indicating an earlier system issue that was successfully mitigated. In this manner, the one or more programs learn from past system failures and the implementation of the aspects of the present invention improve through utilization.

Returning to FIG. 1, the one or more programs generate a message including the at least one recommended management action (140). The one or more programs transmit the message to an authorized computing device outside of the secured environment, via a secured protocol (150). Based on obtaining from the authorized computing device a selection of one recommended management action of the at least one recommended management action, the one or more programs apply the selected recommended management action to the system to remedy the system issue (160).

The recommended actions are dependent upon the system issues and may include, but are not limited to, a system reset, a system reboot, and/or a system move. Actions to mitigate the system issue may also be application specific and when issued, will not act on the entirety of a system in a secured environment, but on a component of a system, such as resetting an application, restarting an application, and/or halting execution of an application. General system changes may also be among the recommended actions, including but not limited to, implementing changes in computing, memory, and/or storage resources.

Figure 2:
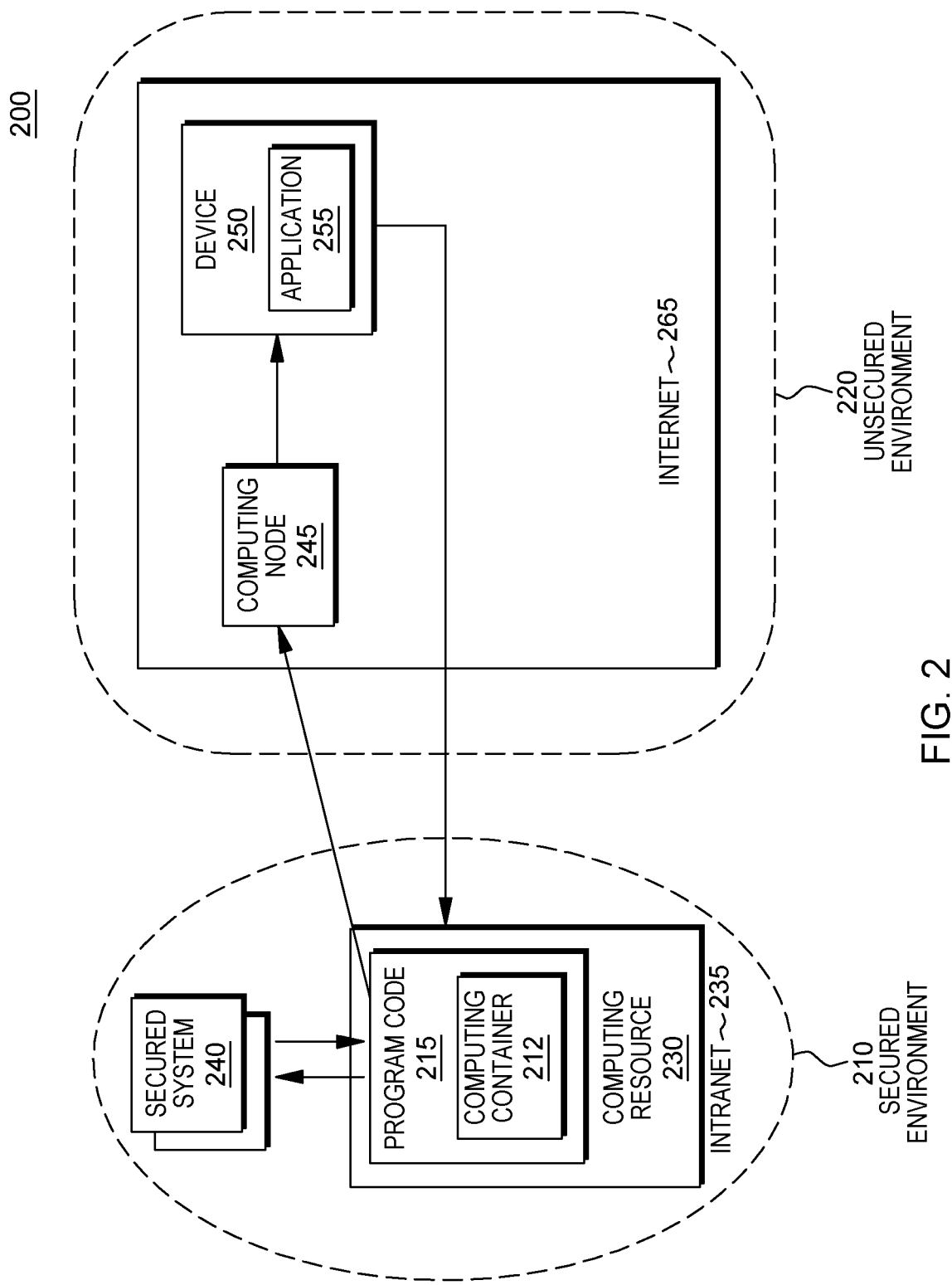
FIG. 2 is an illustration of various aspects of an embodiment of the present invention.

FIG. 2 illustrates several aspects of a technical environment 200 into which certain aspects of embodiments of the present invention may be implemented. In embodiments of the present invention, one or more programs 215 executed by at least one processing circuit on at least one computing resource 230 in a secured environment 210, enable the correction of an issue experienced by a system 240 in the secured environment 210, by a computing device 250 in an unsecured environment 220 that is not part of the secured environment 210. Although FIG. 2 depicts the system 240 and the computing resource 230 in the secured environment 210 as separate resources or groups of resources, in embodiments of the present invention, the one or more programs 215 may also execute completely and/or in part on a resource of the secured system 240.

As illustrated in FIG. 2, one or more programs 215 executing on a computing resource 230 in a secured environment 210, monitor a secured system 240. The computing resource 230 acts as a middleware/gateway server between resources of the secured environment 210 and resources of the unsecured environment 220. In some embodiments of the present invention, the one or more programs 215 may be included in a (e.g., light weight) computing container 212, including but not limited to a docker container, on this gateway server. In some embodiments of the present invention, the system 240 is in the secured environment 210 may be an IBM® zSeries® system. Additionally, while the resources in an unsecured environment 220, including a server 245 and a computing device 250 and communications to these resources are accomplished via a public Internet 265 connection, communications among resources in the secured environment 210, including but not limited to the resource(s) that comprise the system 240 and the computing resource 230, may be accomplished over an intranet 235 connection. In embodiments of the present invention, communications between any resources in the secured environment 210 may be encrypted using known encryption techniques, including but not limited to, Advanced Encryption Standard (AES).

In some embodiments of the present invention, upon recognizing an issue (e.g., receiving an indication of a failure), in the secured system 240, the one or more programs 215 notify a computing device 250 in the unsecured environment 220 of the issue. As illustrated in FIG. 1, the notification includes not only a report that an issue occurred in the secured system 240, but also, options to mitigate the issue, including but not limited to, options to reconfigure elements of the system 240. Thus, based on determining that a failure/issue has occurred in the system 240, the one or more programs 215 formulate options for mitigating the issue. Because the one or more programs 215 are transmitting a notification from a secured environment 210 to an unsecured environment 220, the one or more programs 215 include in the notification only information that can be transmitted safely over a public connection, such as a notification that there is an issue and options for mitigation. The one or more programs do not transmit secure data that they may have received when being notified of and/or diagnosing the initial issue in the system 240. Thus, the one or more programs 215 may retain data related to the issue in the secured environment 235, for example, on a memory resource of the computing resource 230, and transmit only the notification. In some embodiments of the present invention, the one or more programs 215 translate options to mitigate the issue into requests to issue calls to the system 240. Thus, if a given selection is made from the options to mitigate, the one or more programs 215 will make a call to the system 240 and/or the computing resource 230. Thus, although the options in the notifications do not include the data, if the data is required to mitigate the issue, the one or more programs generate an option that includes a request to access this data, so when the option is selected and the one or more programs 215 receive the selection, the one or more programs access the data for use in mitigating the issue.

Referring to FIG. 2, the one or more programs 215 transmit the notification to a server 245 that resides in the unsecured environment 220 (i.e., outside of the secured environment 210). The one or more programs 215 may transmit the notification to the server 245 by utilizing a representational state transfer (REST) application program interface (API), which provides interoperability between computer systems (the resources in the secured environment 210 and the unsecured environment 220) on the Internet 265. The one or more programs 215 may communicate with the server 245 using Hypertext Transfer Protocol (HTTP) or HTTP within a connection encrypted by Transport Layer Security, or its predecessor, a Secure Sockets Layer (HTTPS).

In some embodiments of the present invention, via the server 245, the one or more programs 215 communicate with an application 255, such as a browser, accessible by a computing device 250, such as a mobile computing device, in the unsecured environment 220. For example, based on receiving the notification at the server 245, one or more programs executing on the server 245 communicate the notification to a user of the computing device 250, via an application that is accessible via the device 250. In an embodiment of the present invention, the communications between the server 245 and the device 250 utilize HTTP.

In some embodiments of the present invention, the server 245 is a platform for a service, including but not limited to a cloud platform as a service (PaaS), which delivers services that integrate with applications. In some embodiments of the present invention, the server 245 is an IBM® Bluemix cloud platform as a service. Thus, the server 245 deploys applications to the device 250 as services and as such, deploys the notification of the issue with the system 240 to the device 230 as a service. In some embodiments of the present invention, the one or more programs 215 can provide the notification to the device 250 regardless of whether the individual is connected to an application that is monitoring the secured environment 210 or is actively utilizing the computing device 250.

Responsive to receiving the notification from the one or more programs 215, a user of the device 250 selects an option from the notification to mitigate the reported issue. The one or more programs 215 receive this selection. Thus, as explained above, aspects of the present invention do not require any direct connectivity between a remote device 250 used to mitigate an issue in a secured system 240, and the secured system 240. Rather, the remote computing device 250 communicates with a computing node 215 that serves as a middleware/gateway server.

In some embodiments of the present invention, the one or more programs receive the selection from the device 250 via a REST API and HTTP or HTTPS. Through the HTTPS communication, the one or more programs 215 authenticate the user of the device 250 by verifying the user's username and password. These credentials may be sent automatically as part of the selection or upon receiving the selecting, the one or more programs 215 may prompt for these credentials and trigger the action of the selection if and only if the user is authenticated. Based on receiving the selection (e.g., call to the system 240), the one or more programs 215 gather any data (within the secured environment 210) that is relevant to the action selected, and trigger the action in the system 240 to mitigate the issue.

Based on the selection, the one or more programs 215 may generate a dynamic rule linking the initial system message to the action selected. Thus, when the one or more programs 215 determine that an issue has occurred in the secured system 240, provided that the data related to the issue is similar to that of the initial issue, the one or more programs 215 may apply the dynamic rule and include the action selected in the notification to the computing device 250. As the one or more programs 215 assist in mitigating more and more issues, the one or more programs 215 can develop an ever-increasing group of dynamic rules that account for different types of system issues. In this manner, continuous utilization of aspects of the present invention increases the accuracy as well as the efficiency of the present invention.

FIG. 3 is a workflow 300 relevant to certain embodiments of the present invention, including the embodiments illustrated by FIG. 2. To illustrate further the workflow 300, designators from FIG. 2 are utilized throughout. In an embodiment of the present invention, one or more programs 215 executing on a gateway/middleware server 230 in a secured environment 210, that communicate with resources of both inside and outside of the secured environment 210, receive a system message from a secured system 240 indicating that the secured system 240 has experienced an issue (310). The system message includes secure data characterizing the issue. Based on receiving the indication, the one or more programs 215 evaluate the system message to determine details of the issue (320). Based on determining the details of the issue, the one or more programs 215 generate at least one recommended management action to remedy the system issue (330). In some embodiments of the present invention, when a user selects one of the options, the result is a request to a call of the secured system 240. The recommended management action does not include the secure data, but may include calls to the secure data. The one or more programs 215 generate a notification including the at least one recommended management action (340). Utilizing a secured protocol, the one or more programs 215 transmit the notification to a server 245 outside the secured environment 210 that provides an application 255 as a service to a mobile device 250 of an authorized user of the secured system 240 (350). Based on obtaining, via the application 255 on the mobile device 250, a selection of one recommended management action, the one or more programs 215 translate the selection to the call to the secured system 240, to remedy the issue, in accordance with the selection (360).

Figure 4:
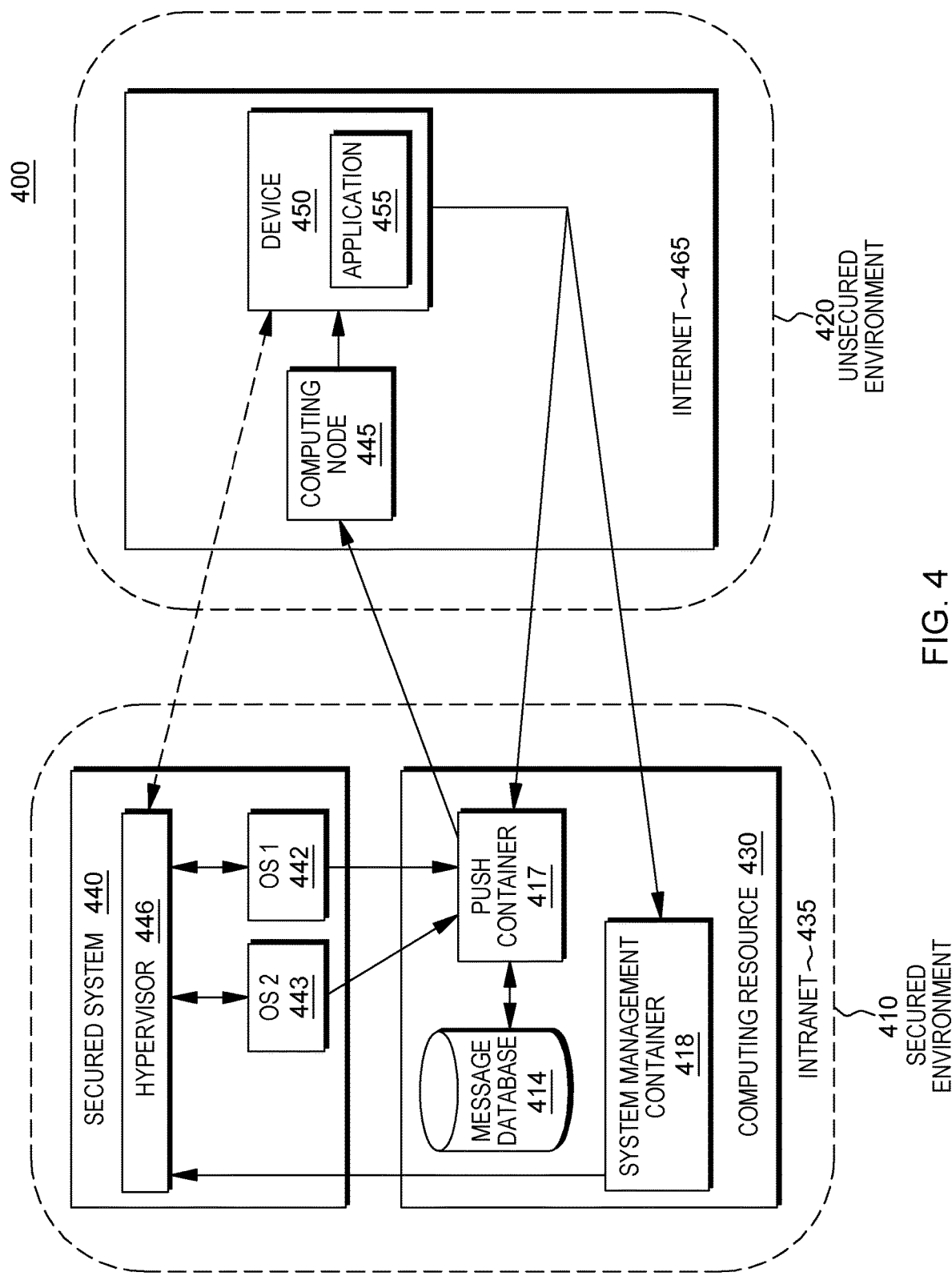
FIG. 4 is an illustration of various aspects of an embodiment of the present invention.

FIG. 4 also illustrates several aspects of a technical environment 400 into which certain aspects of embodiments of the present invention may be implemented. Specifically, this technical environment 400 demonstrates how aspects of the present invention can be implemented in an existing secured environment 410 without changing the infrastructure of the environment. In this technical environment 400, in a secured environment 410, communications may occur between resources utilizing an intranet 435 connection. The secured environment 410 includes an underlying secured system 440, such as a mainframe (e.g., IBM® zSeries® system mainframe) which acts as a host machine, a hypervisor 446, which creates and runs virtual machines, guest machines, including, in this example, operating system 1 (OS1) 442 and OS 2 443. In the secured environment 410, one or more programs 415 (executing on at least one processor of a computing resource 430) that monitor and assist in managing the secured system 440, include a push container 417, to communicate push notifications, a message database 414, to assist in creating the notifications based on the one or more programs 415 analyzing issues/failures obtained from the secured system 440, and a system management container 418, to implement configuration changes to the secured system 440, by connecting to the hypervisor 446 of the secured system 440. The computing resource 430 is a middleware server that acts as mediator gateway between the secured environment 410 and the unsecured environment 420.

The one or more programs 415 in certain embodiments of the present invention obtain notifications of system 440 issues from a guest, e.g., OS1 442 and OS 2 443, which may originate from the hypervisor 446. These communications between elements of components in the secured environment 410 may be accomplished using Transmission Control Protocol (TCP). The one or more programs 415 executing at the computing resource 430 (e.g., middleware/gateway server) receive the issue alert and assign at least one recommended management action to remedy the system issue. In some embodiments of the present invention, the one or more programs determine the recommended management actions at least in part by consulting dynamic rules. As discussed earlier, the one or more programs 415 generate these dynamic rules upon the mitigation of historical issues, for use in aiding in the mitigation of future issues. The dynamic rules may be stored in a message database 414 on the computing resource 430, which is accessible to the one or more programs 415. The message database 414 may also store data that the one or more programs can utilize to interpret the issue alert received from the secured system 440.

In some embodiments of the present invention, the one or more programs 415 utilize a push container 417 to transmit a notification. As discussed in FIG. 2, the notification does not include secure data, which the one or more programs 415 may receive when notified of or determine that there is an issue. Based on the system issue, the one or more programs 415 assign at least one recommended management action to remedy the system issue, based on dynamic rules.

Outside of the secured environment 410, which is referred to as the unsecured environment 420, a server 445 receives the notification from the one or more programs 415 executing on the computing resource 430 (e.g., the gateway/middleware server). In some embodiments of the present invention, the one or more programs 415 communicate the notification to the server 445 via a REST API and HTTP or HTTPS. Via the server 445, the one or more programs 415 communicate with an application executing on a computing device 450, by transmitting a push notification to the computing device 450, via the server 445. In an embodiment of the present invention, the communications between the server 445 and the device 450 utilize HTTP. In some embodiments of the present invention, the server 445 is a platform for a service, including but not limited to a cloud PaaS. The server 445 may be an IBM® Bluemix cloud PaaS. Thus, the application 455 is a service deployed by the server 445 and the server 445 deploys the push notification to the device 450 as a service.

Responsive to receiving the notification, a user of the device 450 selects a recommended management option. The one or more programs 415 receive the selection and utilize a system management container 418, translate the selection into one or more request to the secured system 440. The request may include a command for an action as well as a request for secure data within the system required to complete the mitigation action. The one or more programs 415 make the request to the hypervisor 446 of the secured system 440.

The technical environment 400 of FIG. 4 illustrates an advantage of various embodiments of the present invention: they can be implemented in a non-pervasive manner, can co-exist with existing solutions to remote accessibility for a secured environment 410, such as RDP over VPN without requiring any connection direct connection between a remote device 450 and secured system 440, for example, a connection via RDP over VPN to the hypervisor 446.

Figure 5:
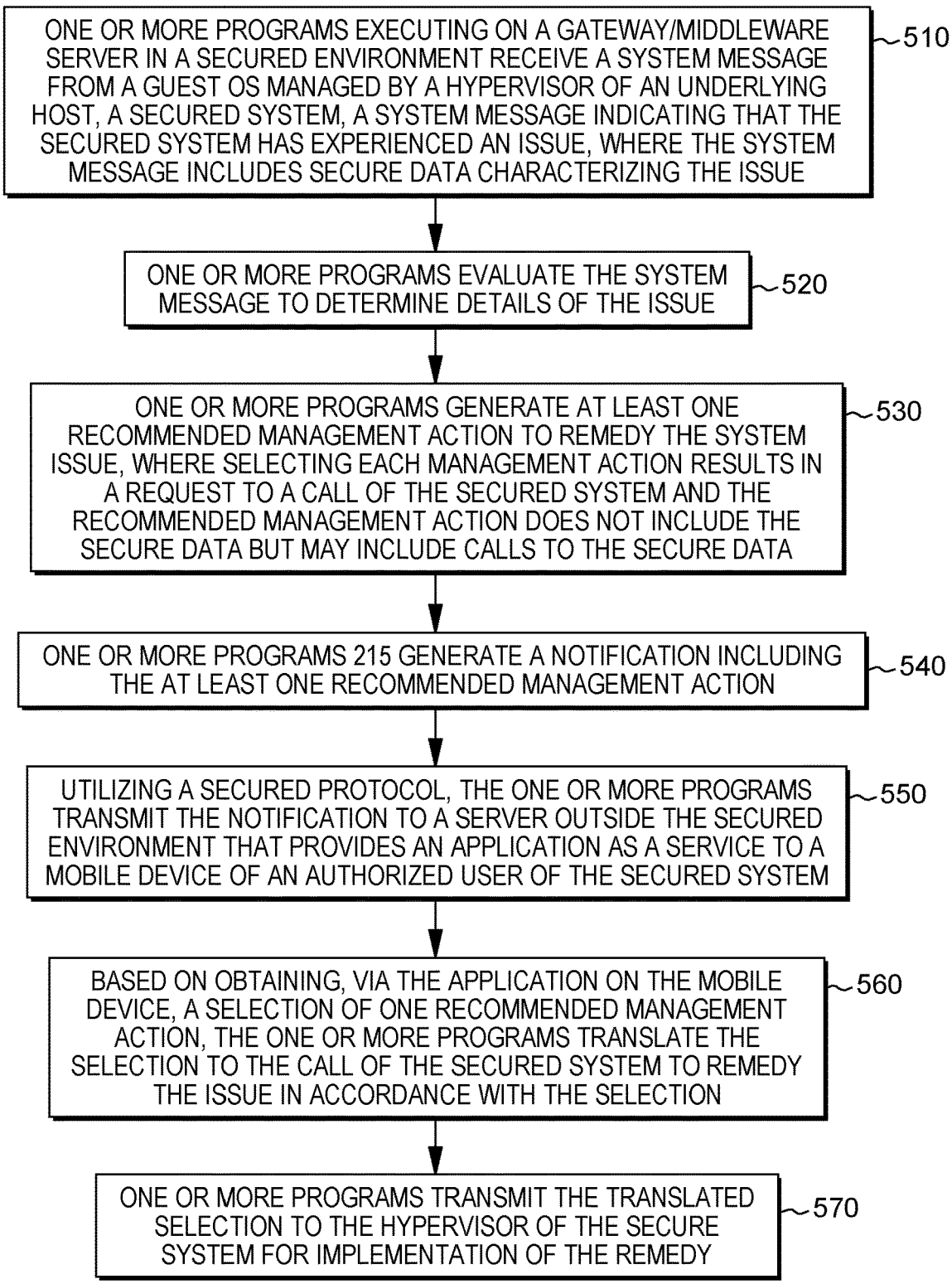
FIG. 5 is a workflow illustrating certain aspects of an embodiment of the present invention.

FIG. 5 is a workflow 500 relevant to certain embodiments of the present invention, including the embodiments illustrated by FIG. 4. To illustrate further the workflow 500, designators from FIG. 4 are utilized throughout. In an embodiment of the present invention, one or more programs 415 executing on a gateway/middleware server 430 in a secured environment 410, that communicate with resources of both inside and outside of the secured environment 410, receive a system message from a guest OS 442-443 managed by a hypervisor 446 of an underlying host, a secured system 440, the system message indicating that the secured system 440 has experienced an issue, where the system message includes secure data characterizing the issue (510). Based on receiving the indication, the one or more programs 415 evaluate the system message to determine details of the issue (520). Based on determining the details of the issue, the one or more programs 415 generate at least one recommended management action to remedy the system issue, where selecting each management action results in a request to a call of the secured system 440 and the recommended management action does not include the secure data, but may include calls to the secure data (530). In an embodiment of the present invention, the one or more programs 415 interpret the system message by referencing data in a message database 314 of gateway/middleware server 430. The one or more programs 415 generate a notification including the at least one recommended management action (540). Utilizing a secured protocol and a push container 317, the one or more programs 415 transmit the notification to a server 445 outside the secured environment 410 that provides an application 455 as a service to a mobile device 450 of an authorized user of the secured system 440 (550). Based on obtaining, via the application 455 on the mobile device 450, a selection of one recommended management action, the one or more programs 415 utilize a system management container 418 on the gateway/middleware server 430 to translate the selection to the call of the secured system 440, to remedy the issue in accordance with the selection (560). The one or more programs 415 transmit the translated selection to the hypervisor 446 of the secured system 440 for implementation of the remedy (570).

Figure 6:
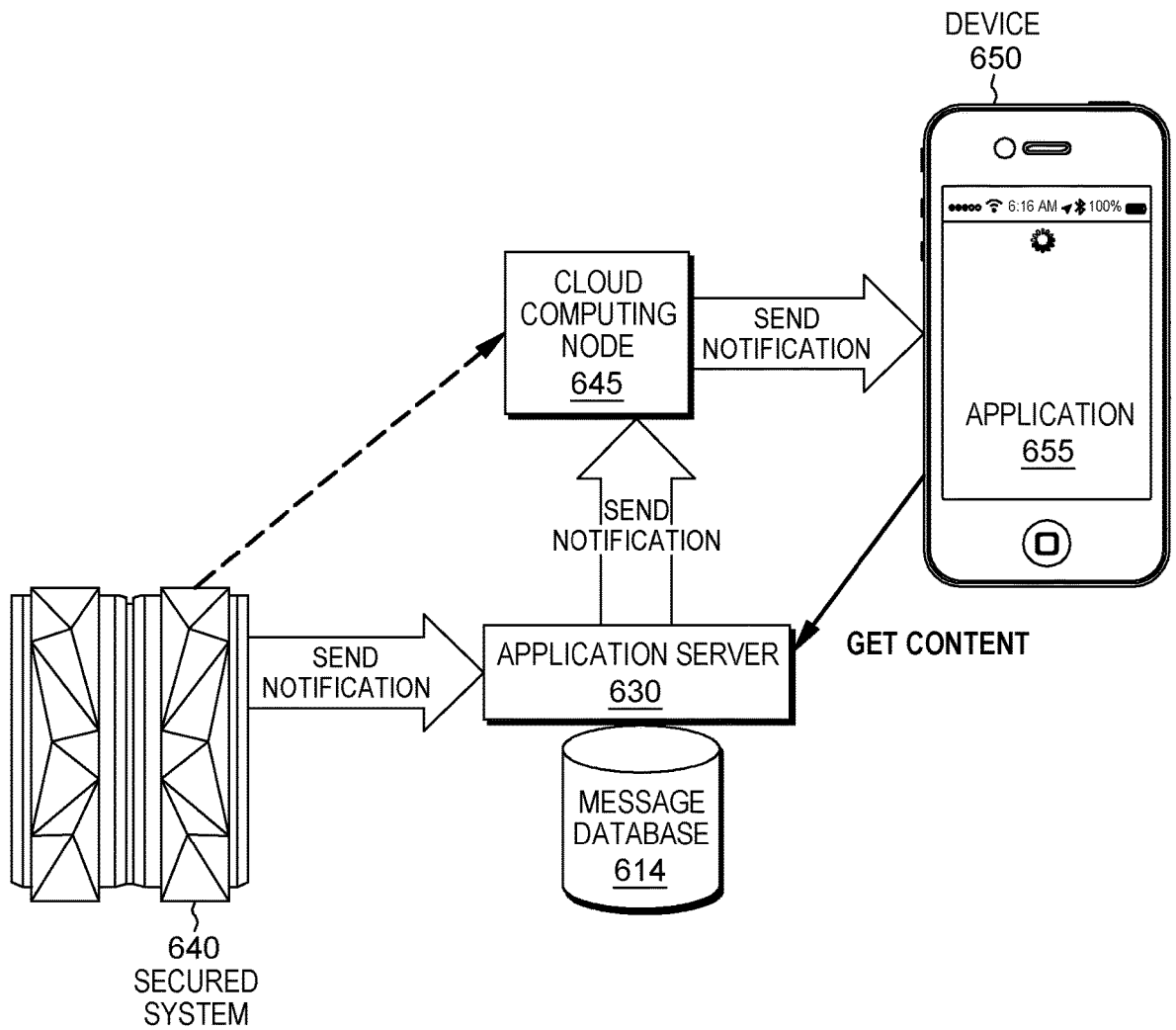
FIG. 6 is an illustration of various aspects of an embodiment of the present invention.

FIG. 6 is an overview of a technical architecture 600 of certain embodiments of the present invention. FIG. 6 also demonstrates the how aspects of embodiments of the present invention enable a mobile device 650 to dynamically access and configure a secured system 640 based on push system messages. In embodiments of a present invention, one or more programs executed by an application server 630 receive an indication of an issue from a secured system 640. The indication is sent as an encrypted communication, for example, over an intranet. Based on receiving this indication, the one or more programs at the application server 630 evaluate the system message, with the assistance of a messages database 614, to determine a system issue. Based on determining the system issue, the one or more programs assign at least one recommended management action to remedy the system issue, based on dynamic rules. The one or more programs then formulate a notification that includes selection options that trigger each of the at least one recommended management actions to cloud computing node 645 (or an application server) outside of the secured environment. The communication between the application server 630 and the cloud computing node 645 is not encrypted because it does not include any secure data related to the recommended management actions or the initial issue, as the one or more programs 615 retain secure data in the secured environment.

In some embodiments of the present invention, the one or more programs 615 utilize a push notification to send the notification to the cloud computing node 645, which provides the notification to an application 655 viewable on a mobile computing device 650. One the mobile computing device 650, a user can view and select from the selection options that trigger each of the at least one recommended management actions. The one or more programs 615 receive the selection of the user from the mobile computing device 650 at the application server 630 through an encrypted communication channel. In an embodiment of the present invention, by selecting the selection option, the user also sends authentication information (e.g., a username and a password) to the one or more programs 615. The one or more programs translate the selection into the respective recommended management action and perform the recommended management action on the secured system 640.

Figure 7:
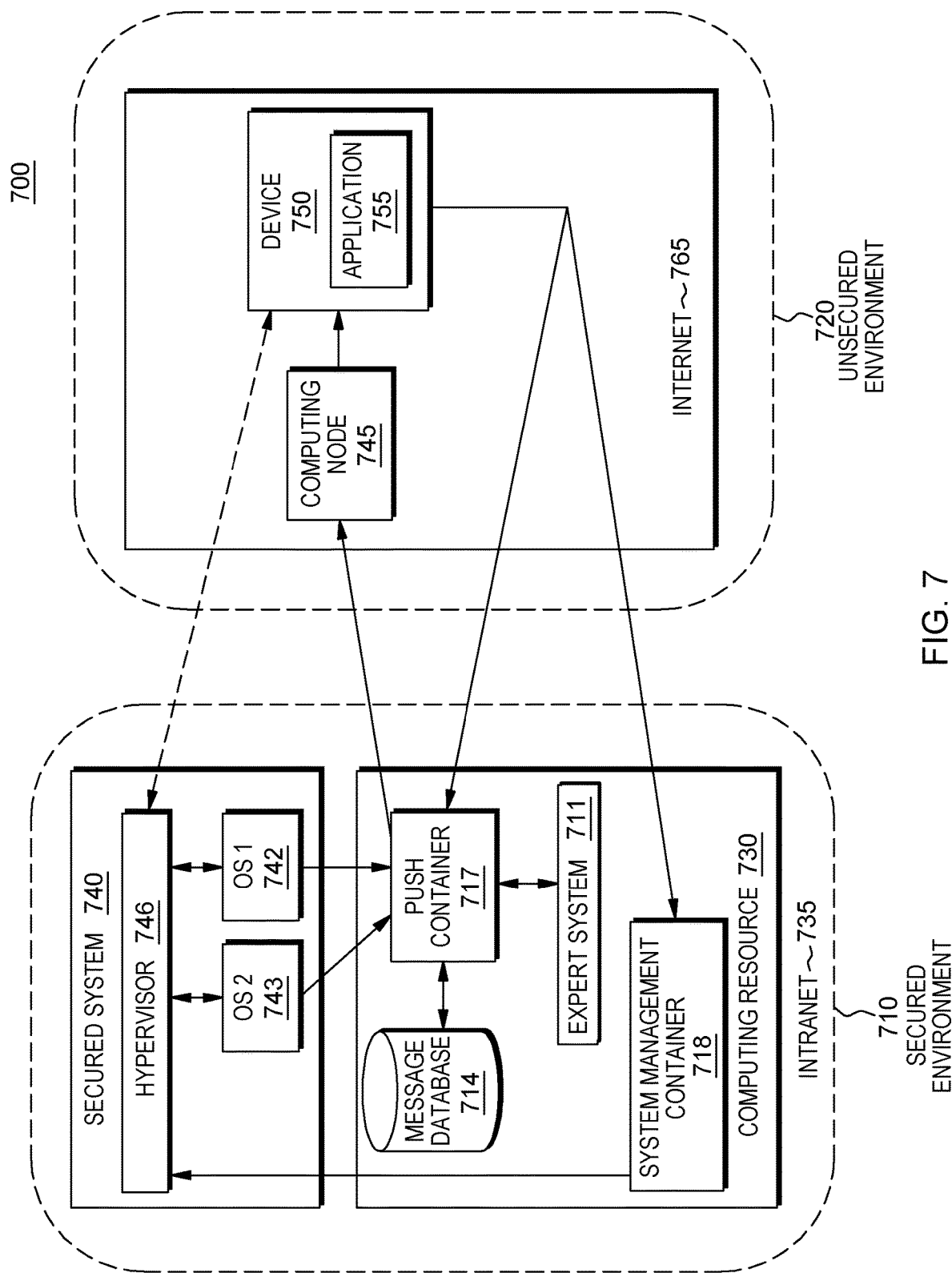
FIG. 7 is an illustration of various aspects of an embodiment of the present invention.

FIG. 7 is an illustration 700 various aspects of some embodiments of the present invention that includes an expert system 711. One or more programs executing as this expert system 711 analyzes a system message received from the secured system 740 and generates recommended options for mitigation to communicate, ultimately, to a computing device 750 outside of the secured environment 710 where the secured system 740 resides.

In an embodiments of the present invention, when a system issue occurs, one or more programs referred to as the expert system 711 analyzes the system message and recommends actions, based, for example, on an analysis of various factors. For example, the one or more programs may recommend actions based on the probability of various known approaches addressing the issue. In determining whether a recommended action has a reasonable probability of mitigating an issue, the one or more programs may evaluate whether multiple actions may address an issue (e.g., restarting a database, and/or restarting an application server). Starting with these multiple actions as possible approaches, the one or more programs utilize historical data to adjust the probabilities of each action mitigating the system issue. The one or more programs may calculate weighted mean of probabilities based on past selections of recommended actions by a user of the computing device 750. The one or more programs may assign the most recent action of the user with a highest probability.

The one or more programs of the expert system 711 may determine that a given issue could be mitigated by adjusting the resources of the secured system 740 (e.g., adding more disk space, increasing or decreasing central processing units). Changing resources allocations may address issues, including but not limited to, improving application response time or utilization, for an application executing in the secured system 740. To make a recommendation, the one or more programs may determine how much of different resources should be added to a secured system 740 to mitigate the issue indicated by the system message. The one or more programs may determine resources changes based on historical issue mitigation of issues. For example, the one or more programs may analyze the last "n" selections of recommended actions by a user of the computing device 750 and generate a (piecewise) linear regression-based model (minimizing the sum of squared residuals).

In some embodiments of the present invention, the system management container 718 is communicatively coupled to the expert system 711 such that when an action on the secured system 740 is triggered by a selection of an option by a user of the computing device 750, the one or more programs comprising the system management container 718 that receive this selection can send the selection directly to the expert system 711, allowing the expert system learn the selected action.

FIG. 8 is a workflow 800 that illustrates certain aspects of some embodiments of the present invention. For ease of understanding, workflow 800 references elements of FIG. 7 as a non-limiting example of an implementation of the workflow 800 in an embodiment of the present invention. In an embodiment of the present invention, one or more programs executed on one or more processing resources in a secured environment 710 initialize an expert system 711 (810). Once initialized, the one or more programs communicate with the expert system 711 to determine the recommended options to mitigate a given issue and to communicate those issues to a computing device outside of a secured environment, for selection of an option. Examples of dynamic rules that may comprise this expert system 711 are listed below.

Rule 1: If a message identifier is "X", then suggest actions a, b, and c.

Rule 2: If a message identifier is "Y", then suggest action a, d, e

Rule 3: If a message identifier is "Y", then suggest an action adding x % of resource types m, n, and 1.

Returning to FIG. 8, the one or more programs detect a message with a given message identifier (e.g., X) from a guest (e.g., OS 1 742) of a secured system 740 in the secured environment 710 (820). Based on detecting the message, the one or more programs call a push handler (e.g., of push container 717) in the secured environment 710 (830). The one or more programs (i.e., the expert system 711) get suggested actions from the initialized expert system 711 based on the message identifier of the message (840). The one or more programs communicate the suggested actions to a computing device 750 outside of the secured environment 710, via a computing node 745 outside of the secured environment 710, including but not limited to a proxy, to get data from the computing device 750 indicating a selection of an action of the suggested actions (850). In an embodiment of the present invention, the computing node 745, a proxy, sends a notification to an application 755 executing on the computing device 750. The one or more programs receive a selection of an action from an application 755 executing on the computing device 750 and based on receiving the selection, the one or more programs trigger the action (860). In an embodiment of the present invention, the one or more programs that receive the selection may be understood as a system management container 718. The system management container 718 may trigger the action based on communicating with a hypervisor 746 executing on the secured system 740. The one or more programs inform the expert system 711 of the selected action, such that the expert system 711 learns from this selection, as related to the message identifier of the original system message (870).

As demonstrated in FIGS. 1-8, among the advantages of aspects of some embodiments of the present invention are: 1) immediate notification of issues couples with a mechanism to adjust the target system to mitigate the issues; 2) secured system data remains confidential, i.e., in a protected area; 3) the mechanism enabling access to a secured environment for an unsecured environment is not an exposure risk; and 4) aspects of the invention can be integrated into existing environments, so no installation of additional software or hardware is needed.

In embodiments of the present invention, a computer-implemented method, a computer program product, and a computer system include program code that provides a method for dynamically accessing and configuring secured systems by utilizing connectivity provided through mobile computing. In some embodiments of the present invention, one or more programs executed by at least one processing circuit in a first computing environment obtain from a computer system in the first environment, a system message indicating an issue in the computer system. The one or more programs evaluate the contents of the system message, where the system message comprises data from the computer system to determine details of the issue. Based on determining the details of the system issue, the one or more programs determine one or more recommended actions to remedy the issue. The one or more programs generate a notification including one or more recommended actions, where the one or more recommended actions include calls to portions of the computer system, where the generating includes retaining the data in the first environment, where the notification includes respective selection options to trigger the one or more programs to execute each of the one or more recommended actions in the first environment. The one or more programs transmit the notification to a computing node in a second computing environment, where based on receiving the notification, the computing node communicates the notification to a computing device in the second computing environment. The one or more programs receive, via a secure protocol, from the computing device, a response indicating selection of a respective selection option of the respective selection options. The one or more programs translate the respective selection option into a recommended action of the one or more recommended actions. The one or more programs issue, based on the recommended action, calls of the recommended action to the computer system to remedy the issue. In some embodiments of the present invention, the notification is a push notification In some embodiments of the present invention, the first computing environment is a secured computing environment that includes computing resources in communication with each other via an intranet connection and computing resources of the second computing environment are not authorized to access the intranet connection.

In some embodiments of the present invention, when the one or more programs receive via the secure protocol the one or more programs receive the response, which includes a username and a password associated with a user of the computing device. The one or more programs accept the response, based on validating the username and a password. When receiving this response, the one or more programs may decrypt this response, as it may be sent in an encrypted format.

In some embodiments of the present invention, as part of receiving the response, the one or more programs generating a dynamic rule linking the system message to the selection. The one or more programs may retain this rule in a memory resource for future reference. Thus, the one or more programs may obtaining, from the computer system in the first environment, a new system message indicating another issue in the computer system. The one or more programs evaluate the contents of the new system message, where the new system message includes additional data from the computer system to determine details of the other issue, where the details of the other issue include identifying a similarity between the new system message and the system message. Based on determining the details of the new system issue, the one or more programs determine a recommended action to remedy the other issue which includes assigning the recommended action to remedy the other issue based on the dynamic rule. The one or more programs generate a new notification that includes the recommended action to remedy the other issue and the respective selection option for this action. The one or more programs transmit the new notification to the computing node in the second computing environment, where based on receiving the new notification, the computing node communicates the notification to the computing device in the second computing environment. The one or more programs receive, via the secure protocol, from the computing device, a response indicating selection of the respective selection option. The one or more programs translate the respective selection option into the recommended actions to remedy the other issue. The one or more programs issue, based on the recommended action, calls comprising the recommended action to the computer system to remedy the other issue.

In some embodiments of the present invention, the one or more recommended actions may include system reset, system reboot, and system move. The calls comprising the recommended action may access a portion of the data retained in the first environment.

In some embodiments of the present invention, an application executing on a middleware server comprises the one or more processors in the first computing environment.

In some embodiments of the present invention, the computer system includes a mainframe executing a host process monitoring at least one guest process. Thus, the one or more programs obtain the system message from the at least one guest process. In these embodiments, issuing calls may include issuing calls to the host process of the computer system.

In some embodiments of the present invention, the computing node provides the notification to the computing device as a service. And in some embodiments of the present invention, the remedy (to the issue) includes utilizing a portion of the data.

Figure 9:
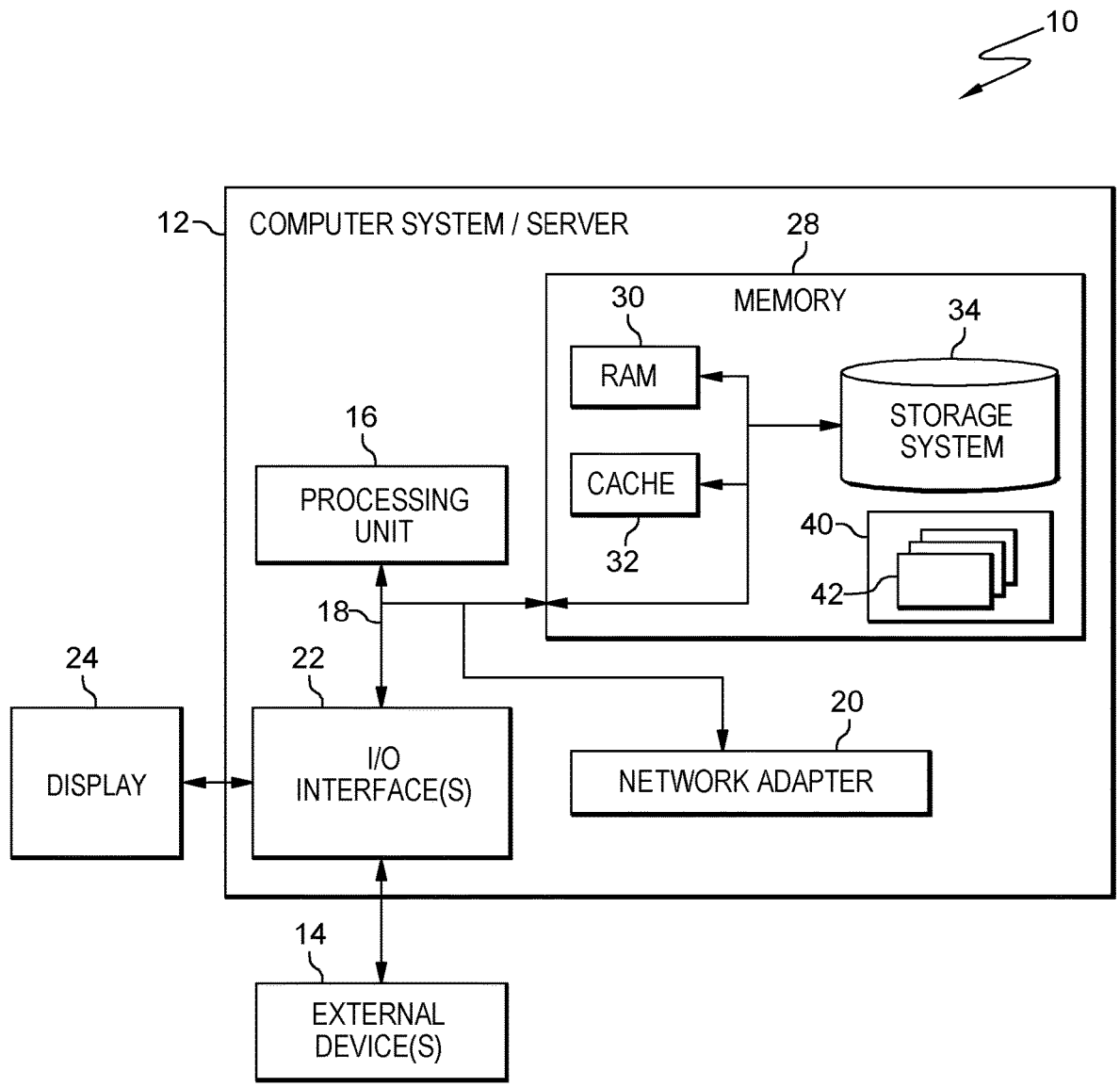
FIG. 9 depicts one embodiment of a computing node that can be utilized in a cloud computing environment.

Referring now to FIG. 9, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, computing node 245 (FIG. 2), computing node 445 (FIG. 4), and computing node 645 (FIG. 6) can be understood as cloud computing node 10 (FIG. 9) and if not a cloud computing node 10, then one or more general computing node that includes aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
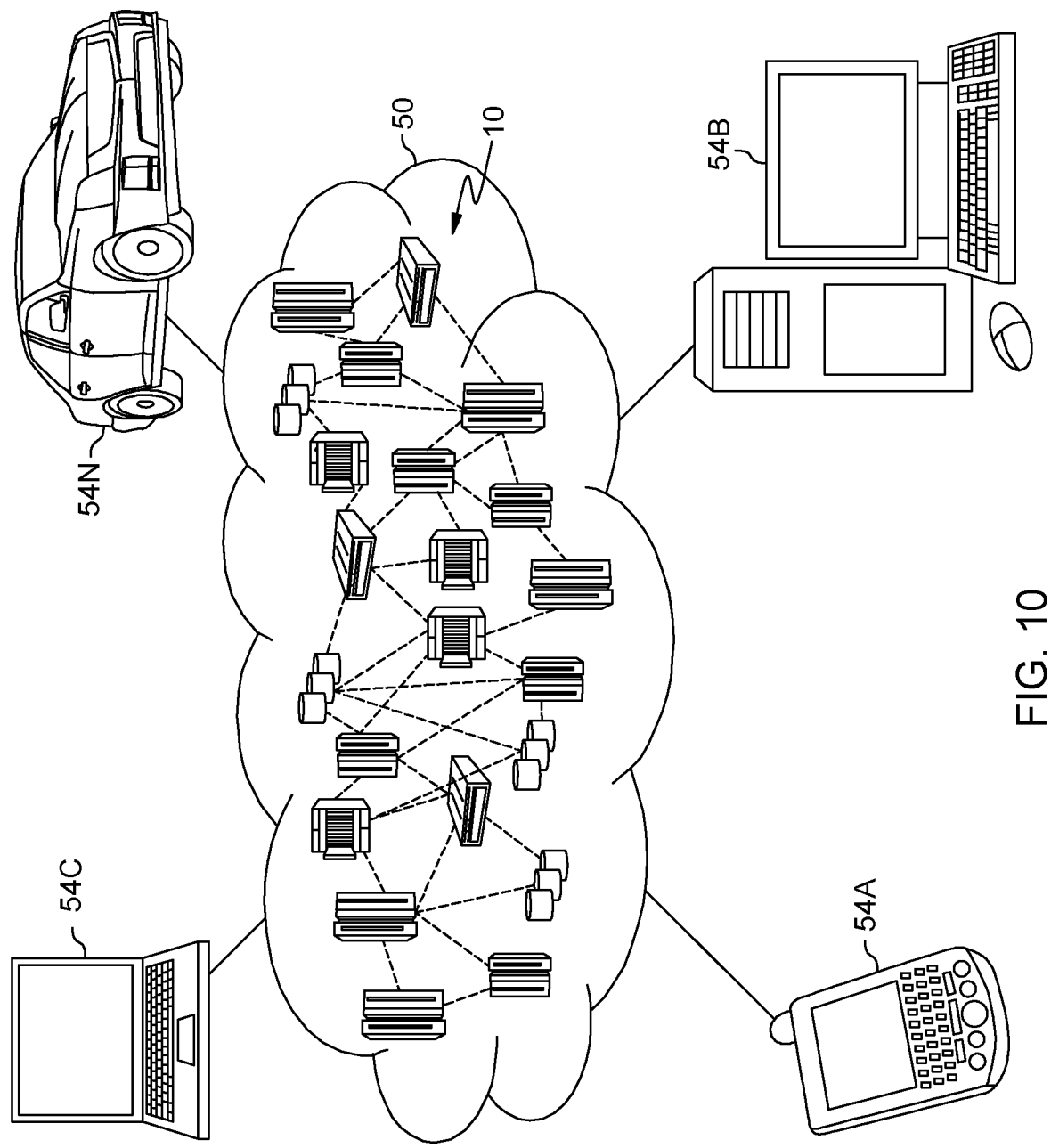
FIG. 10 depicts a cloud computing environment according to an embodiment of the present invention.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
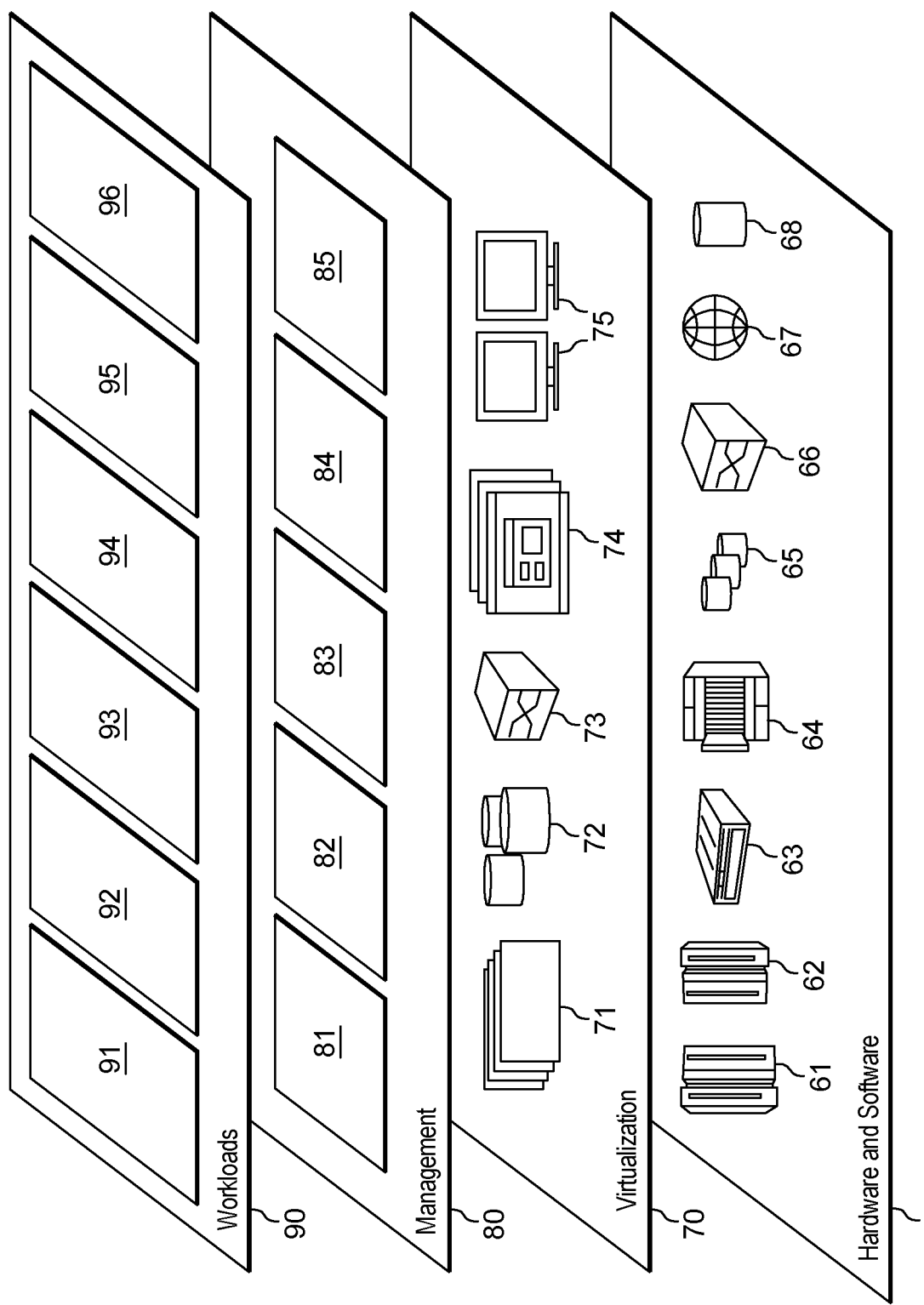
FIG. 11 depicts abstraction model layers according to an embodiment of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing a push message as a service 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
    obtaining, by one or more processors in a secured environment communicatively coupled to at least one resource inside of the secured environment and at least one resource outside of the secured environment, a system message from a secured system in the secured environment indicating that the secured system has experienced an issue;
    determining, by the one or more processors, details of the issue, based on evaluating the system message;
    based on the determining, generating, by the one or more processors, at least one recommended management action to remedy the issue;
    generating, by the one or more processors, a notification, wherein the notification comprises the at least one recommended management action;
    transmitting, by the one or more processors, via a secured protocol, the notification to a server outside the secured environment, wherein the server provides an application as a service to a computing node utilized by an authorized user of the secured system; and
    obtaining, by the one or more processors, a selection of one recommended management action of the at least one recommended management action, via the application, wherein the application was accessed via the computing node; and
    translating, by the one or more processors, the selection to a call to the secured system, to remedy the issue, in accordance with the selection.

2. The computer-implemented method of claim 1, wherein the one or more processors comprise one or more processors of a gateway server.

3. The computer-implemented method of claim 1, wherein the system message comprises data characterizing the issue.

4. The computer-implemented method of claim 1, further comprising:
    initiating, by the one or more processors, the call to the secured system.

5. The computer-implemented method of claim 1, wherein the notification does not include secure data in the secured system.

6. The computer-implemented method of claim 1, wherein the notification comprises at least one call to secure data in the secured system.

7. The computer-implemented method of claim 1, wherein the computing node comprises a mobile device.

8. A computer program product comprising:
    a computer readable storage medium readable by one or more processors and storing instructions for execution by the one or more processors for performing a method comprising:
        obtaining, by the one or more processors, wherein the one or more processors are located in a secured environment, wherein the one or more processors are communicatively coupled to at least one resource inside of the secured environment and at least one resource outside of the secured environment, a system message from a secured system in the secured environment indicating that the secured system has experienced an issue;
        determining, by the one or more processors, details of the issue, based on evaluating the system message; based on the determining, generating, by the one or more processors, at least one recommended management action to remedy the issue;
        generating, by the one or more processors, a notification, wherein the notification comprises the at least one recommended management action;
        transmitting, by the one or more processors, via a secured protocol, the notification to a server outside the secured environment, wherein the server provides an application as a service to a computing node utilized by an authorized user of the secured system; and
        obtaining, by the one or more processors, a selection of one recommended management action of the at least one recommended management action, via the application, wherein the application was accessed via the computing node; and
        translating, by the one or more processors, the selection to a call to the secured system, to remedy the issue, in accordance with the selection.

9. The computer program product of claim 8, wherein the one or more processors comprise one or more processors of a gateway server.

10. The computer program product of claim 8, wherein the system message comprises data characterizing the issue.

11. The computer program product of claim 8, the method further comprising:
    initiating, by the one or more processors, the call to the secured system.

12. The computer program product of claim 8, wherein the notification does not include secure data in the secured system.

13. The computer program product of claim 8, wherein the notification comprises at least one call to secure data in the secured system.

14. The computer program product of claim 8, wherein the computing node comprises a mobile device.

15. A system comprising:
a memory;
one or more processors in communication with the memory; and
program instructions executable by the one or more processors via the memory to perform a method, the method comprising:
obtaining, by the one or more processors, wherein the one or more processors are located in a secured environment, wherein the one or more processors are communicatively coupled to at least one resource inside of the secured environment and at least one resource outside of the secured environment, a system message from a secured system in the secured environment indicating that the secured system has experienced an issue;
determining, by the one or more processors, details of the issue, based on evaluating the system message;
based on the determining, generating, by the one or more processors, at least one recommended management action to remedy the issue;
generating, by the one or more processors, a notification, wherein the notification comprises the at least one recommended management action;
transmitting, by the one or more processors, via a secured protocol, the notification to a server outside the secured environment, wherein the server provides an application as a service to a computing node utilized by an authorized user of the secured system; and
obtaining, by the one or more processors, a selection of one recommended management action of the at least one recommended management action, via the application, wherein the application was accessed via the computing node; and
translating, by the one or more processors, the selection to a call to the secured system, to remedy the issue, in accordance with the selection.

16. The system of claim 15, wherein the one or more processors comprise one or more processors of a gateway server.

17. The system of claim 15, wherein the system message comprises data characterizing the issue.

18. The system of claim 15, the method further comprising:
initiating, by the one or more processors, the call to the secured system.

19. The system of claim 15, wherein the notification does not include secure data in the secured system, and wherein the notification comprises at least one call to secure data in the secured system.

20. The system of claim 15, wherein the computing node comprises a mobile device.

* * * * *